United States Patent
Stewart et al.

(10) Patent No.: US 10,180,704 B1
(45) Date of Patent: Jan. 15, 2019

(54) DEVICE WITH FOLDABLE DISPLAY (71) Applicant: Lenovo (Singapore) Pte. Ltd., Singapore (SG)

(72) Inventors: Aaron M. Stewart, Raleigh, NC (US); Jonathan Jen-Wei Yu, Raleigh, NC (US); Jeffrey Earle Skinner, Raleigh, NC (US); Lincoln Penn Hancock, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/643,042

(22) Filed: Jul. 6, 2017

(51) Int. Cl.
*G06F 1/16* (2006.01)

(52) U.S. Cl.
CPC .......... *G06F 1/1652* (2013.01); *G06F 1/1616* (2013.01); *G06F 1/1643* (2013.01); *G06F 1/1681* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,016,176 A | * | 1/2000 | Kim | G02F 1/133305 349/158 |
| 8,125,759 B2 | * | 2/2012 | Fukuma | F16G 13/18 248/349.1 |
| 8,194,399 B2 | * | 6/2012 | Ashcraft | G06F 1/1626 257/59 |
| 9,335,793 B2 | * | 5/2016 | Rothkopf | A45C 13/002 |
| 9,412,341 B2 | * | 8/2016 | Lin | G09G 5/14 |
| 9,514,669 B2 | * | 12/2016 | Zhang | G09G 3/22 |
| 2007/0097014 A1 | * | 5/2007 | Solomon | G06F 1/1616 345/1.1 |
| 2013/0120912 A1 | * | 5/2013 | Ladouceur | H04M 1/0268 361/679.01 |
| 2014/0092566 A1 | * | 4/2014 | Shirasaka | H05K 5/0017 361/749 |
| 2014/0226275 A1 | * | 8/2014 | Ko | G06F 1/1626 361/679.27 |
| 2015/0370287 A1 | * | 12/2015 | Ko | G06F 1/1626 361/749 |
| 2017/0075389 A1 | * | 3/2017 | Yeom | G06F 1/1652 |
| 2017/0185289 A1 | * | 6/2017 | Kim | G06F 1/1641 |

* cited by examiner

Primary Examiner — Lisa Lea Edmonds
(74) Attorney, Agent, or Firm — Brian J. Pangrle

(57) ABSTRACT

A device can include a folding case that includes a fold region that defines a first portion and a second portion of the folding case; a housing disposed on the first portion of the folding case where the housing includes a processor, memory operatively coupled to the processor, and a keyboard operatively coupled to the processor; and a flexible display operatively coupled to the processor and disposed in part on the first portion of the folding case and disposed in part on the second portion of the folding case.

20 Claims, 10 Drawing Sheets

FIG. 1

(Prior Art)

Example Grip Size Table 300
(circumference = $2\pi r_o$)

| US Sizes | European Sizes | Sizes in mm |
|---|---|---|
| 4 inches | 0 | 100-103 mm |
| 4 1/8 inches | 1 | 103-106 mm |
| 4 1/4 inches | 2 | 106-110 mm |
| 4 3/8 inches | 3 | 110-113 mm |
| 4 1/2 inches | 4 | 113-118 mm |
| 4 5/8 inches | 5 | 118-120 mm |
| 4 3/4 inches | 6 | 120-123 mm |

$r_o > \sim 15$ mm

DEVICE WITH FOLDABLE DISPLAY

TECHNICAL FIELD

Subject matter disclosed herein generally relates to technology for computing or other devices.

BACKGROUND

A laptop, or notebook, computing device can have a display housing with a display and a keyboard housing with a keyboard where a hinge assembly couples the two housings, for example, along a lower edge of the display housing and a back edge of the keyboard housing.

SUMMARY

A device can include a folding case that includes a fold region that defines a first portion and a second portion of the folding case; a housing disposed on the first portion of the folding case where the housing includes a processor, memory operatively coupled to the processor, and a keyboard operatively coupled to the processor; and a flexible display operatively coupled to the processor and disposed in part on the first portion of the folding case and disposed in part on the second portion of the folding case. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
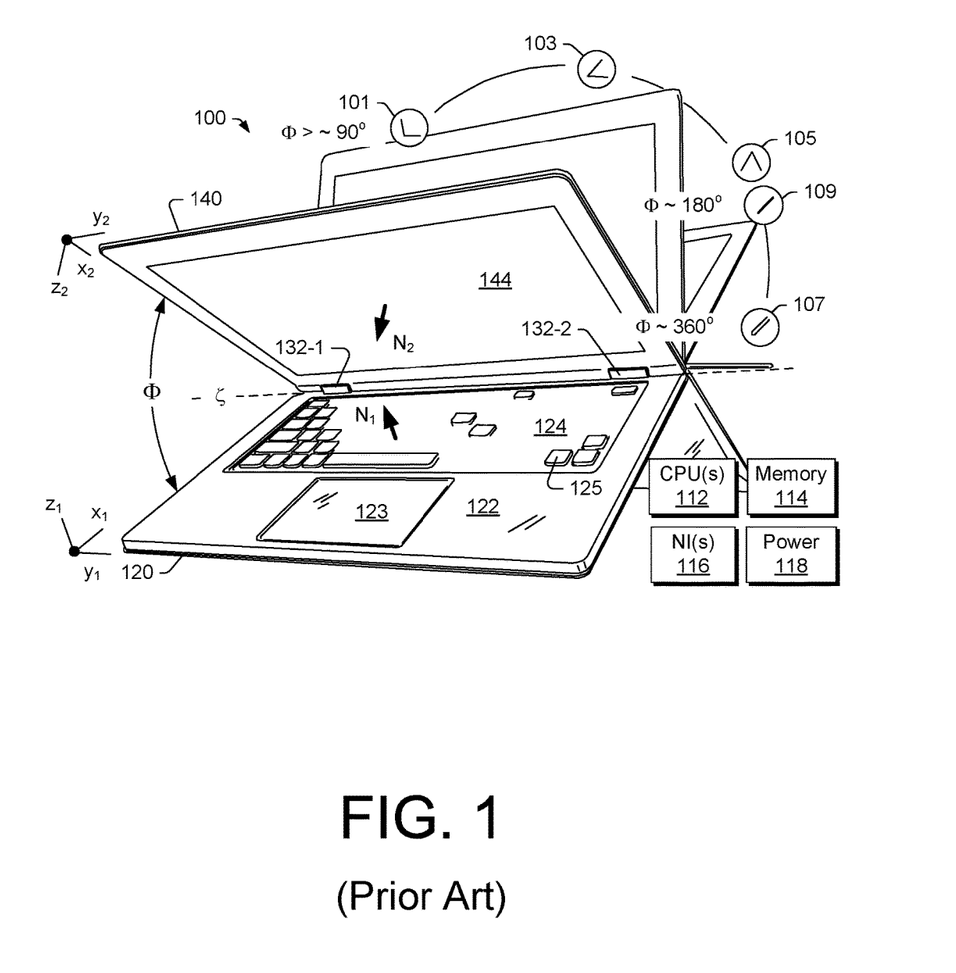
FIG. 1 is a diagram of an example of a device and example orientations of the device.

FIG. 1 shows an example of a device 100 that includes a keyboard housing 120 and a display housing 140 that are pivotable with respect to each other via movement about one or more hinges 132-1 and 132-2 (e.g., hinge assemblies). The device 100 may be a device such as, for example, a computing device (e.g., an information handling device).

As an example, the device 100 may include one or more processors 112, memory 114 (e.g., one or more memory devices), one or more network interfaces 116, and one or more power cells 118. Such components may be, for example, housed with the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144. In such an example, the keyboard 124 is defined in a first Cartesian coordinate system as having a depth along an x-axis ($x_1$), a width along a y-axis ($y_1$) and a height or thickness along a z-axis ($z_1$) that extends in a direction outwardly away from touch surfaces of keys 125 of the keyboard 124 and the display 144 is defined in a second Cartesian coordinate system as having a depth along an x-axis ($x_2$), a width along a y-axis ($y_2$) and a height or thickness along a z-axis ($z_2$) that extends in a direction outwardly away from a viewing surface of the display 144. As an example, a coordinate system may be right-handed or left-handed.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis.

FIG. 1 shows some examples of orientations 101, 103, 105, 107 and 109. The orientations 101, 103, 105, 107 and 109 may correspond to orientations of a clamshell computing device. The orientation 101 may be a notebook orientation where the angle Φ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both).

As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.). As an example, the frontal surface 122 may be a surface suitable for resting a palm or palms of a hand or hands. For example, as shown in FIG. 1, the touch input surface 123 can be defined by x and y dimensions where a left palm rest surface is to the left of the touch input surface 123 and where a right palm rest surface is to the right of the touch input surface 123. In such an example, the left and right palm rest surfaces may be defined by respective x and y dimensions as well as a spacing therebetween. Where a device does not include a touch input surface such as the touch input surface 123, the frontal surface 122 may extend in the y direction approximately from a left side of the keyboard housing 120 to a right side of the keyboard housing. Such a surface can be a left and right palm rest surface.

As to the orientation 103, it may correspond to a display orientation for viewing the display 144 where the keyboard 124 faces downward and the device 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle $\Phi$ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the device 100 (e.g., where the angle $\Phi$ is about 0 degrees), the vectors $N_1$ and $N_2$ would be pointing toward each other.

The orientation 109 may be a planar orientation where the angle $\Phi$ is about 180 degrees such that a normal outward vector $N_1$ of the keyboard 124 of the keyboard housing 120 and a normal outward vector $N_2$ of the display 144 of the display housing 140 are oriented in approximately the same pointing directions.

Various computing devices such as laptop, or notebook, computing devices can be characterized at least in part by a footprint. For example, the device 100 of FIG. 1 may be characterized at least in part by dimensions in x and y as to the keyboard housing 120 and/or as to the display housing 140. As an example, a footprint can be an area that can be defined by a plane in the x and y directions of the Cartesian coordinate systems shown in FIG. 1.

A user may utilize a device that can execute a number of applications where one or more of the applications can call for rendering information to a display. The U.S. Department of Labor Occupational Health and Safety Administrations provides guidance for viewing a display (e.g., a monitor), including use of a viewing distance that is between 20 inches and 40 inches (50 cm and 100 cm) from the eye to the front surface of the display. A user in an ergonomic seating position with the device 100 on a desk may have a viewing angle of about 40 degrees to about 50 degrees (e.g., angle from the display 144 to the user's eyes).

Figure 2A:
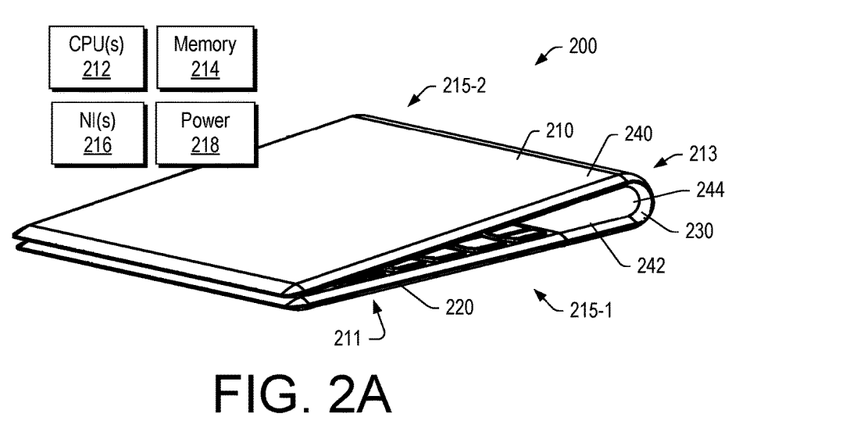
FIG. 2A and FIG. 2B are diagrams of an example of a device in a closed orientation and in an open orientation.
Figure 2B:
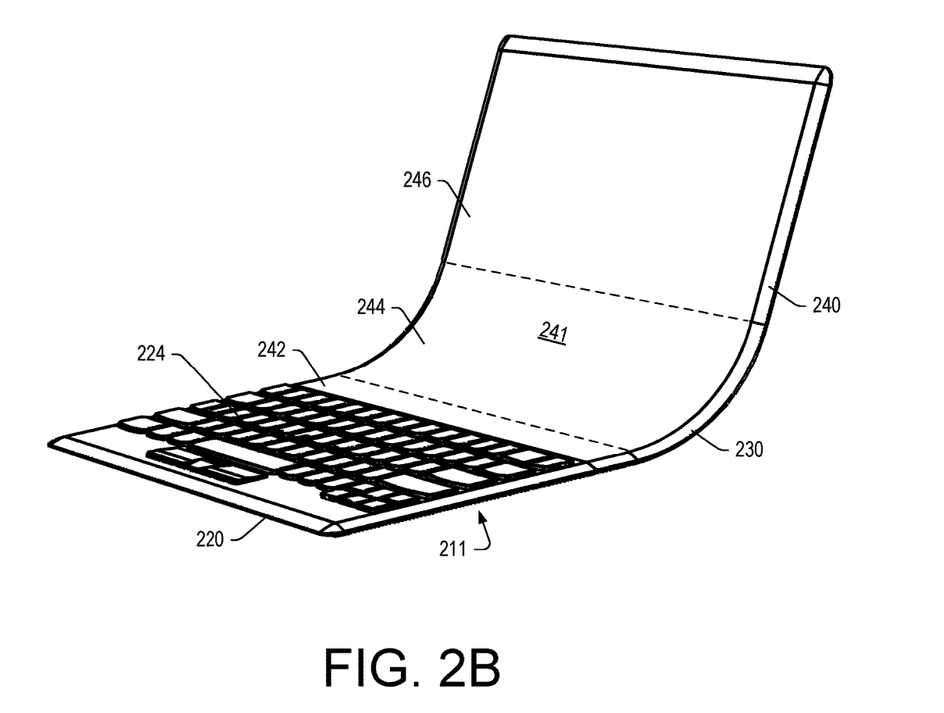

FIG. 2 shows an example of a device 200 in two orientations, which can be referred to as a closed orientation (top) and an open orientation (bottom). As shown, the device 200 can include a folding case 210 that includes a fold region 213 that defines a first portion 215-1 and a second portion 215-2 of the folding case 210; a housing 211 disposed on the first portion 215-1 of the folding case 210 where the housing 211 can include a processor 212, memory 214 operatively coupled to the processor 212, and a keyboard 224 operatively coupled to the processor 212; and a flexible display 241 operatively coupled to the processor 212 and disposed in part on the first portion 215-1 of the folding case 210 and disposed in part on the second portion 215-2 of the folding case 210. The device 200 can transition from the closed orientation to the open orientation via curvature of the fold region 213. The fold region 213 can define a radius of curvature for the closed orientation of the device 200 and can define a radius of curvature for the open orientation of the device. As an example, the device 200 may be orientable in a plurality of open orientations.

In the example of FIG. 2, the device 200 can be defined at least in part by a keyboard portion 220, a foldable portion 230 and a display portion 240 where the display 241 and include a portion 242 that can be substantially planar to the keyboard portion 220, a portion 244 that can be adaptable to curvature of the folded portion 230, and a portion 246 that can be substantially planar to the display portion 240. As shown in FIG. 2, the display 241 can span a portion of the first portion 215-1 of the folding case 210 (see, e.g., the portion 242 of the display 241), the fold region 213 of the folding case 210 (see, e.g., the portion 244 of the display 241) and a portion of the second portion 215-2 of the folding case 210 (see, e.g., the portion 246 of the display 241).

As an example, a user in an ergonomic seating position with the device 200 on a desk may have a viewing angle of about 40 degrees to about 50 degrees (e.g., angle from display portion 246 to the user's eyes). In such an example, the user can view the display portion 242 and the display portion 244 (e.g., when seated at a distance of between approximately 20 inches and approximately 40 inches (e.g., approximately 50 cm and approximately 100 cm) from the eye to the front surface of the display portion 246).

As an example, the device 200 can include one or more processors 212, memory 214 accessible by at least one of the one or more processors 212; one or more network interfaces 216 and one or more power cells 218. In the example of FIG. 2, the housing 211 can be a keyboard housing that houses at least a portion of the keyboard 224. As an example, the housing 211 can be a circuitry housing that includes a display interface that can be operatively coupled to one or more displays. In such an example, the circuitry can include display circuitry such as one or more graphics processors (e.g., cores, etc.). As an example, memory can be accessible to display circuitry where the display circuitry can render information from the memory to one or more displays. As an example, display circuitry may optionally render information to one or more of the portions 242, 244 and 246 of the display 241. As an example, one or more of the portions 242, 244 and 246 of the display 241 may be a touchscreen display portion. For example, the portion 242 can be a touchscreen display where a user may extend a finger or fingers from the keyboard 224 and touch the portion 242, for example, such that the device 200 receives touch input (e.g., via approach touch sensing circuitry).

In the example of FIG. 2, the device 200 may be referred to as an asymmetrically folding display device because the display 241 has the portion 244 that spans the fold region 213 of the foldable case 210. In FIG. 1, the keyboard housing 120 area (e.g., footprint) is substantially the same as the display housing 140 area and the display 144 is confined by the display housing 140. The device 100 of FIG. 1 can be substantially symmetrical with respect to the two housings 120 and 140 as coupled by the one or more hinges 132-1 and 132-2.

The display 241, or at least the portion 244, can be a flexible display. As an example, a flexible display may be a flexible electronic paper based display. As an example, a flexible display may be a flexible Organic Light Emitting Diode (OLED) based display (e.g., FOLED). FOLED can include a flexible plastic substrate on which electroluminescent organic semiconductor is deposited. Such a flexible display can be bent or rolled, optionally while operating.

An OLED emits light due to the electroluminescence of thin films of organic semiconductors that may be approximately 100 nm thick. OLEDs may be fabricated on a glass substrate and/or a flexible plastic such as polyethylene terephthalate (PET) and/or another type of polymeric material. As an example, a flexible OLED display can be fabricated by deposition of an organic layer onto a substrate, optionally using a printing type of method.

As an example, an OLED display can be made up of a layer of organic material placed between two conductors. In such an example, the two conductors (an anode and a cathode) can be between a glass top plate (seal) and a glass bottom plate (substrate). When an electric current is applied to the two conductors, the organic material produces a bright, electro-luminescent light. When energy passes from the negatively charged layer (cathode) to the other (anode) layer, it stimulates the organic material between the two, which in turns emits lights that is visible through the outermost layer of glass.

To produce color, an electric current can be applied to stimulate relevant pixels on the OLED display. Pixels can be created by an arrangement of the cathodes and anodes; which can be arranged perpendicular to each other. The electric current applied to the selected strips of anodes and cathodes determine which pixels get turned on and which pixels remain off and brightness of each pixel can be proportional to the amount of applied current.

A color OLED can include a metal cathode with a negative charge, an electron transport layer, organic material, a hole transport layer, and an anode with a positive charge. Each pixel of a color OLED may be divided into red, green, and blue sub-pixels. When a controller (e.g., display circuitry) applies an electric current to a particular pixel, the current passes through the organic material causing the material to emit light. By adjusting the intensity of the electric current in each red, green, and blue sub-pixel, specific colors and gradients can be created.

As to the device 200 of FIG. 2, as mentioned, it can be asymmetric with respect to the fold region 213 and the display 241. Such an approach can allow for a reduction in the footprint of the device 200 when compared to, for example, the device 100 of FIG. 1.

In the open orientation of FIG. 2 (e.g., an open clamshell mode), the bottom portion 242 of the display 241 is within easy reach of a user's hands on the keyboard 224. The short reach to the portion 242 of the display 241 affords better interaction where the portion 242 is a touch-enabled screen.

In the open orientation of FIG. 2, there is viewability of and ease of interaction with the open, curved display 241 where a curve may be defined at least in part via a radius of curvature. Such a curve may be formed via the fold region 213 of the foldable case 210. For example, the fold region 213 may include material that can be formed and hold its form. For example, a chain link type of hinge may be a friction hinge that can be formed via links and axles and hold its form via friction. As an example, the fold region 213 may include a malleable material that can be formed and hold its form. Such a material may include metallic material and/or polymeric material.

As an example, the fold region 213 may be adjustable as to its outer dimension, which may, for example, be defined in part by a radius (e.g., of a semi-circular profile, a semi-elliptical profile, a semi-oval profile, etc.). In such an example, the fold region 213 may optionally be folded to a shape that is comfortably grippable (e.g., graspable) by a single hand.

As an example, with respect to the first portion 215-1 of the foldable case 210, it may include a touchpad. For example, the first portion 215-1 of the foldable case 210 can include a housing or housings that house the keyboard 224 and/or a touchpad. As an example, the keyboard 224 may include a pointable controller (e.g., a TRACKPOINT™ controller).

Figure 3A:
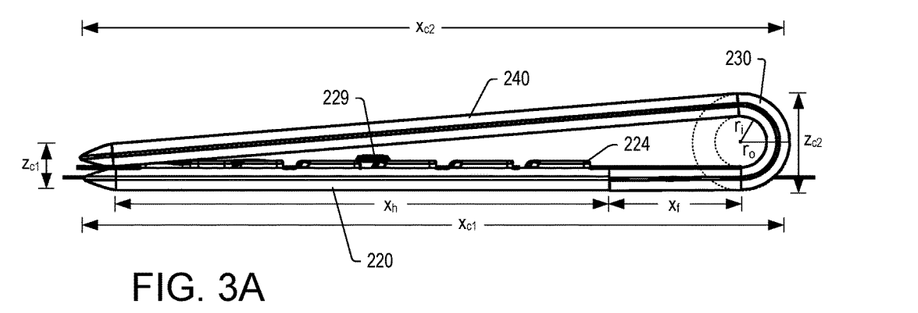
FIG. 3A, FIG. 3B and FIG. 3C are a series of views of the device of FIG. 2A and FIG. 2B in the closed orientation and an example of a table of grip sizes.
Figures 3B, 3C:
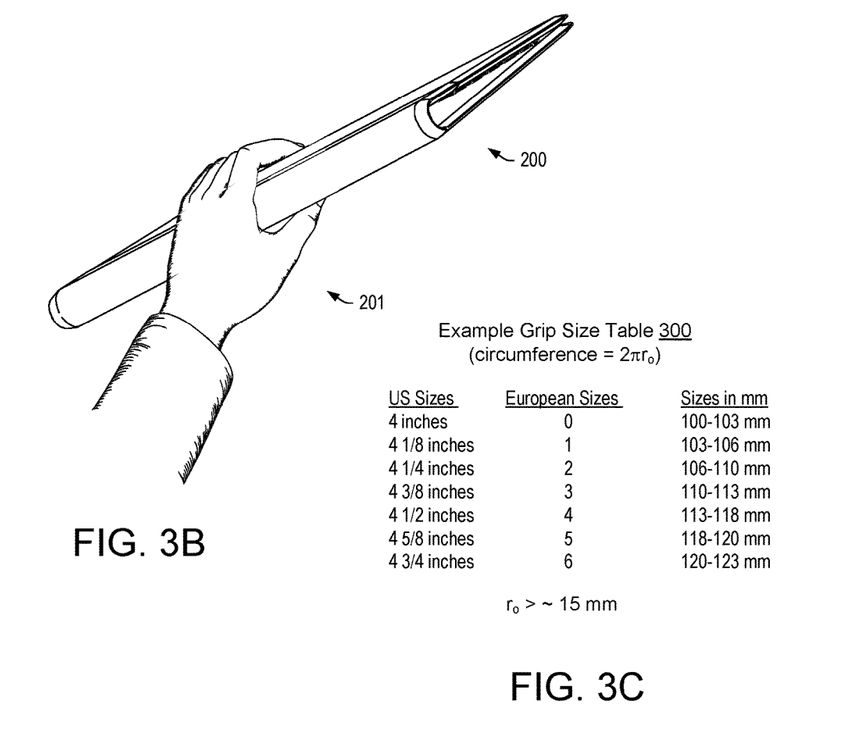

FIG. 3 shows the device 200 in a closed orientation in a side view and in a perspective view where it is grasped by a hand 201. In the side view, the device 200 can be defined in part by various dimensions: a bottom side depth $x_{c1}$, a corresponding top side depth $x_{c2}$, a keyboard depth $x_h$, a display portion depth $x_f$, a closed end thickness $z_{c1}$, a fold region thickness $z_{c2}$, an inner radius $r_i$ and an outer radius $r_0$.

As to grippability, a table 300 in FIG. 3 shows some examples of tennis racquet grips in terms of circumference. As an example, a circumference of approximately 100 mm corresponds to an outer radius of approximately 15 mm (e.g., a diameter of approximately 30 mm). As an example, an outer radius can be greater than or equal to approximately 15 mm for grippability (e.g., graspability).

As mentioned, the device 200 may include a fold region that can be adaptable. For example, a chain link hinge may be set to a desired radius of curvature, for example, to match a hand size. A hand size may be a child's hand size or an adult's hand size. As an example, a device may be orderable (e.g., manufacturable) in sizes, which may include standardized sizes such as the European sizes for tennis racquet hand grips.

As shown in FIG. 3, in the closed orientation, a gap can exist between portions of the device 200. For example, a substantially trapezoid gap or substantially triangular gap may be defined in part by a larger dimension near the foldable portion 230 (see, e.g., $r_i$) and a smaller dimension near where the ends come together (see, e.g., $z_{c1}$), which may be approximately zero or zero where contact occurs. As shown in the example of FIG. 3, keys of the keyboard 224 may extend away from the keyboard portion 220 and toward the display portion 240 where, in the closed orientation, at least some of the keys, if not all of the keys, do not contact the display portion 240. For example, the device 200 can be dimensioned such that at least some keys, if not all keys, of the keyboard 224 do not contact a surface of a display of the display portion 240 when the device 200 is in a closed orientation. Such an arrangement can help to reduce risk of key surfaces contacting and marking a display surface. As shown in FIG. 3, where the keyboard 224 includes a control tool 229 that extends substantially perpendicular to the keyboard 224, optionally to an extent that is above upper surfaces of keys of the keyboard 224, the formation of the gap in the closed orientation can reduce risk of the control tool 229 from contacting a surface of a display of the display portion 240. While keys and a control tool are mentioned, the gap may provide for one or more other features (e.g., components, etc.) that can be disposed within the gap where, for example, a reduced risk (e.g., or no risk) exists under normal user conditions for marring of a surface of a display (e.g., as caused by contact, contact and movement, etc.).

In the example of FIG. 3, the device 200 may include one or more magnets. For example, the device 200 may include one or more magnets that can provide a magnetic attraction force that can help to maintain the device 200 in the closed orientation, for example, during transport, while in a suitcase, a bag, etc. For example, one or more of the edges of the device 200 can include ferromagnetic material that includes at least one magnet. In such an example, a user folds the device 200, the materials can come close enough for interaction of a magnetic attraction force. In such an example, the device 200 may "snap-close". As an example, such a force may be overcome via force of a hand where one or more fingers of the hand may, for example, be inserted into a gap of the device 200 between the portions 220 and 240 to apply force sufficient to overcome the magnetic attraction force. As an example, a device may include a material such as VELCRO™ that can help maintain the device in a closed orientation. As an example, a device can include a clip or clips that may help maintain the device in a closed orientation. As an example, a device can include a fold region that can include a structure that allows for folding and retention in a folded state and that allows for unfolding and retention in an unfolded state. Such a structure may, for example, include components that contact with friction therebetween where the frictional force is sufficient to maintain the device in an unfolded state or in an folded state as a stand-alone state (e.g., resting on a desk, in a bag, in a suitcase, etc.).

Figure 4A:
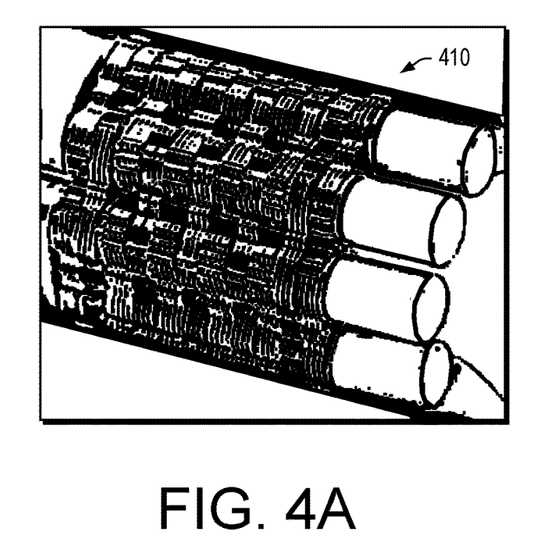
FIG. 4A and FIG. 4B are a series of views of examples of fold regions.
Figure 4B:
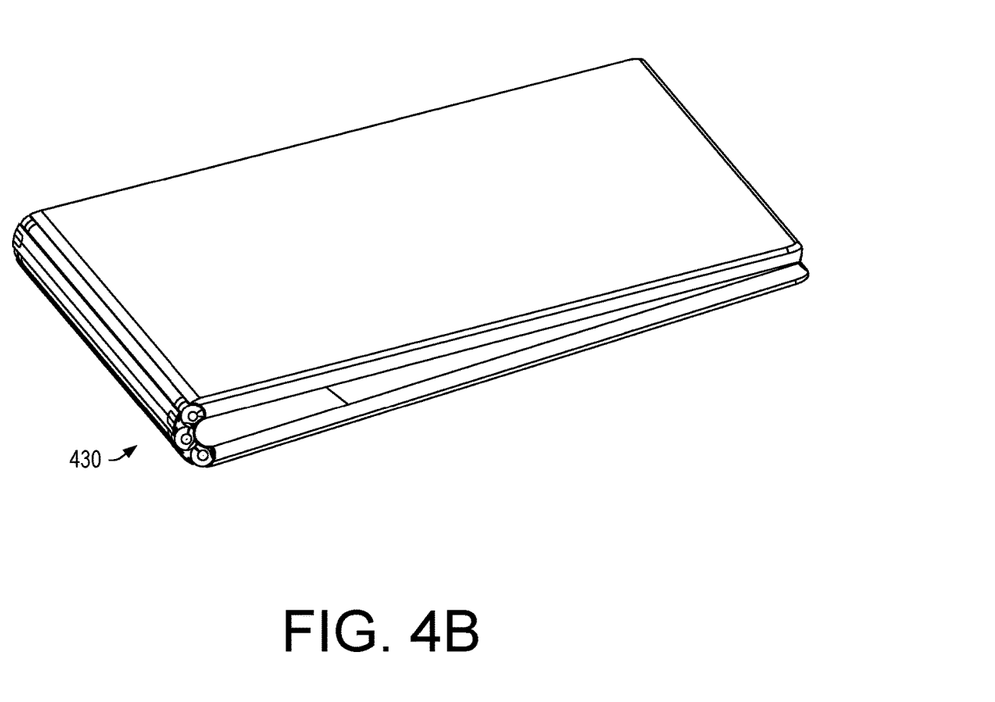

FIG. 4 shows an example of a fold region 410 and an example of a fold region 430. The fold region 410 can be formed via a plurality of axles that are operatively coupled via links. The fold region 410 may be referred to as a watchband type of fold region or a watchband hinge assembly. The example fold region 410 includes four intermediate axles and two end axles. The number and size of axles may be selected to form a desired radius of curvature. Further, such a fold region can include one or more limiters, which may be surfaces of components that contact to define a minimum radius of curvature for a closed orientation of a device.

As to the fold region 430, it includes a plurality of axles and links where the links are shaped to define a minimum radius of curvature for a closed orientation of a device. Such a fold region may be referred to as a lobster hinge assembly, for example, where it includes plates that extend across hinges where the plates can slide with respect to each other.

As an example, a fold region can include a hinge assembly that is metallic, polymeric and/or ceramic. For example, a watchband hinge assembly can include polymeric axles and polymeric links or, for example, metallic axles and polymeric links, or, for example, polymeric axles and metallic links. As an example, a hinge assembly of a fold region may be coated at least in part by one or more coatings and/or covered at least in part by one or more covers. As mentioned, a fold region may include features that are anti-slip, anti-rotation, etc. that can function to add stability to a device when it is in an open orientation. As an example, one or more ribs may extend in a manner akin to the plates of the fold region 430 where the one or more ribs may extend a distance outwardly. As an example, the fold region 410 and/or the fold region 430 can provide component to component contact with an amount of friction that is sufficient to maintain the device 200 (e.g., where including a fold region such as, for example, the fold region 410, the fold region 430, etc.) in one or more states.

Figure 5:
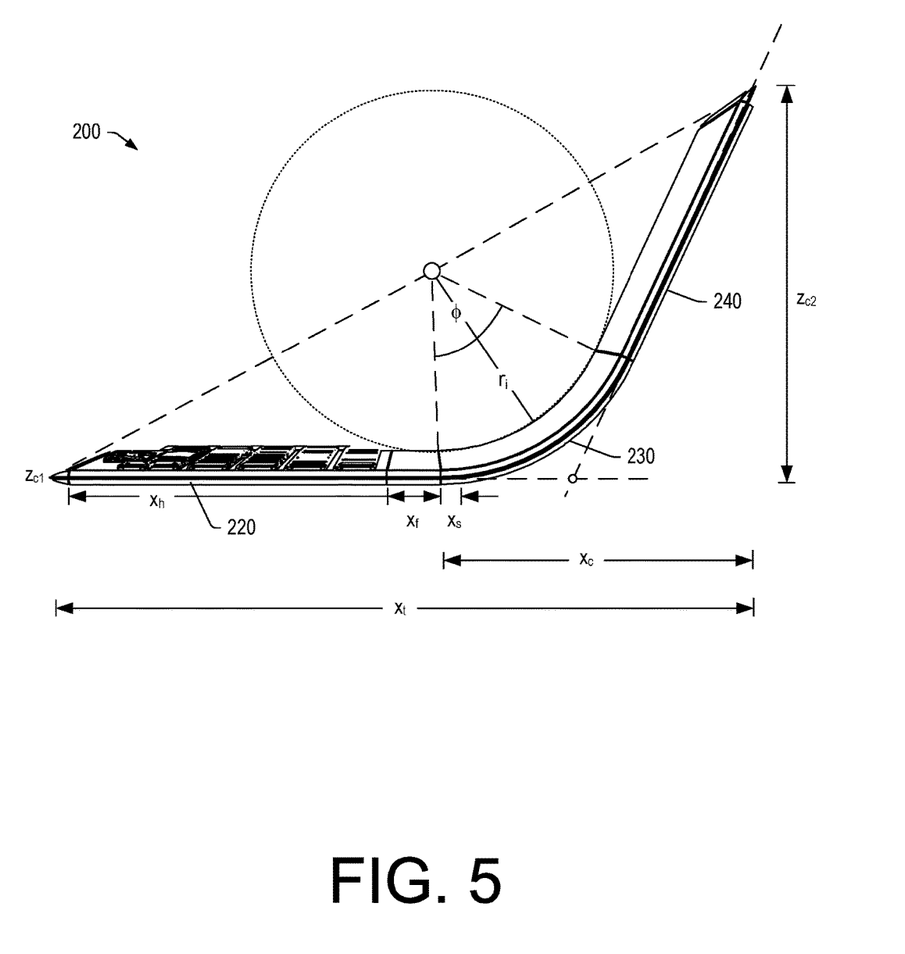
FIG. 5 is a side view of the example device of FIG. 2 in an open orientation.

FIG. 5 shows an example of the device 200 in an open orientation. As shown, the open orientation can be defined by one or more dimensions such as, for example, a radius of curvature $r_i$ and an arc angle $\phi$ of a curved portion of the foldable display 241.

In the example of FIG. 5, the device 200 can be seated on a substantially planar surface such as a surface of a table or a desk. In such an example, the footprint of the device 200 may be enlarged when compared to the closed orientation shown in FIG. 3. In such an example, upon transitioning the device 200 from the closed orientation to the closed orientation, the footprint of the device 200 can be enlarged and, by being enlarged, can increase stability of the device 200. For example, the increase in stability via an enlarged footprint may help to resist tilting of the device 200 responsive to force applied by a finger touching the display 241. Further, where a user may apply an excessive touch to the display 241, the device 200 can merely rotate, for example, about an axis that may be defined by an origin of the radius of curvature.

A depth of the footprint of the device 200 can be defined by the dimensions $x_h$, $x_f$ and $x_s$ where the dimension $x_s$ may be an enlarged portion when the device 200 is in the open orientation shown in FIG. 5. FIG. 5 further shows a total dimension in the x-direction as $x_t$ and a curved portion dimension $x_c$. As an example, the device 200 can be defined in the open orientation of FIG. 5 via a hypotenuse that is defined as a line between open ends of the device 200 (see, e.g., dashed line extending from an upper end to a lower end). In such an example, the device 200 may be defined with respect to a triangle where various angles are formed and where a radius of curvature (e.g., $r_i$) may be defined with respect to a vertex (e.g., a corner) of the triangle. Various features of the device 200 may be defined with respect to one or more dimensions, angles, etc., as shown in the view of FIG. 5.

As shown in the example of FIG. 5, opposing ends of the device 200 can define a straight line where an origin of a radius of curvature of the fold region 213 may coincide with the straight line. As shown in FIG. 5, the arc angle of the fold region 213 (e.g., the display portion 244) may be less than approximately 90 degrees. As to an angle formed by the keyboard 224 and the display portion 246, it is shown to be greater than 90 degrees in the example of FIG. 5.

In FIG. 5, the height of the device 200 can be defined by the dimension $z_{c2}$, while a thickness of the device 200 may be defined by the dimension $z_{c1}$. As an example, the fold region 213 of the foldable case 210 may optionally include one or more features that may help to prevent rotation of the device 200. For example, an outer surface of the fold region 213 can include ridges (e.g., ribs, etc.). As an example, the outer surface of the foldable case 210 may be a rubberized surface (e.g., an elastomeric surface). Such a surface may increase friction coefficient (e.g., dynamic coefficient of friction) to help the device 200 resist sliding along a surface and/or to facilitate grip in a hand of a user.

Figure 6:
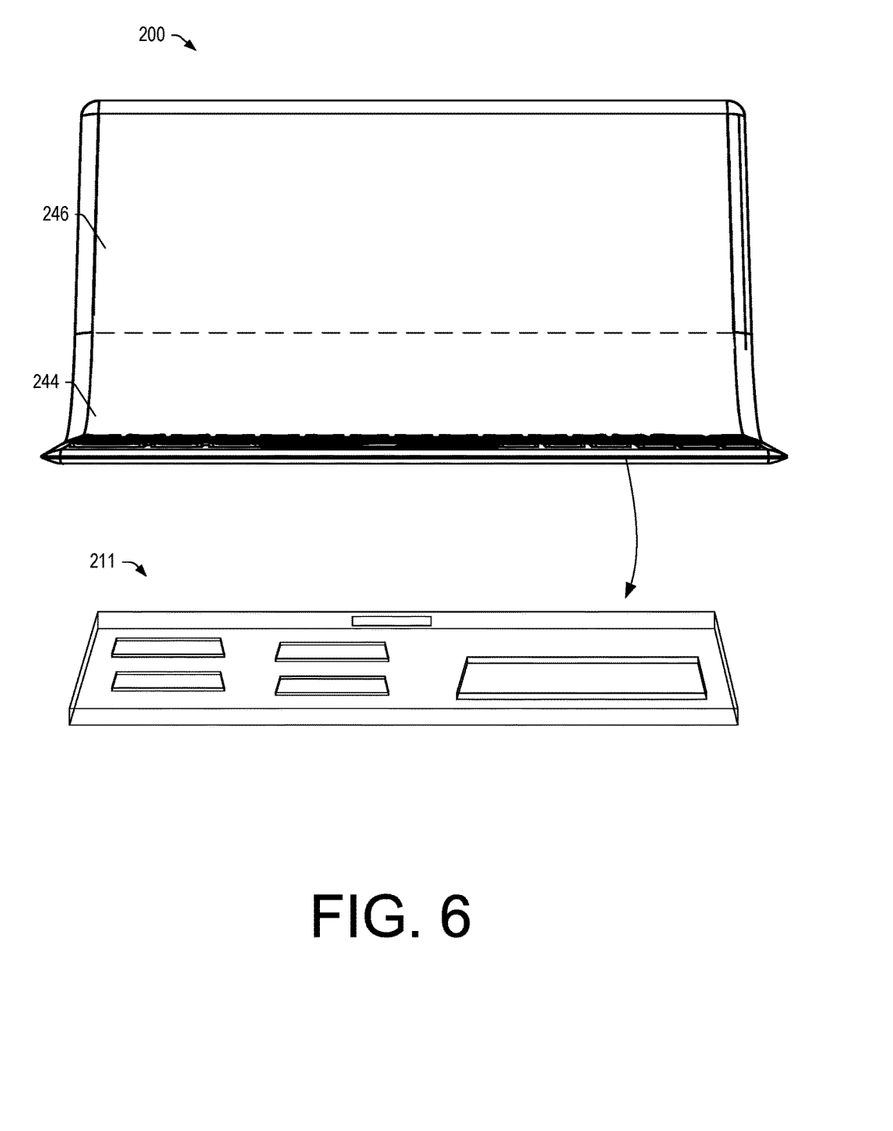
FIG. 6 is a front view of the example device of FIG. 2 in an open orientation.

FIG. 6 shows a front view of the device 200 in an open orientation where the display portions 244 and 246 are visible. FIG. 6 also shows an example of the housing 211 along with various components (e.g., circuitry, a battery, interface(s), etc.). As an example, the housing 211 can include an interface for a flexible display such as a FOLED display. For example, such an interface may provide for transmission of information and/or power. As an example, a flexible display can include an electrical plug that can be inserted into a receptacle, which can be an electrical interface to operatively couple the flexible display to other circuitry (e.g., circuitry of the housing 211, etc.). The device 200 can include a housing such as the housing 211 that operatively couples to a flexible display such as the display 241, which can include portions 242, 244 and 246. In such an example, the housing 211 and the display 241 can be coupled to a foldable case that includes a fold region (see, e.g., the fold region 410 and the fold region 430). As an example, the housing 211 may include one or more sockets for one or more electrical components (e.g., USB, video, audio, power, memory, etc.).

Figure 7:
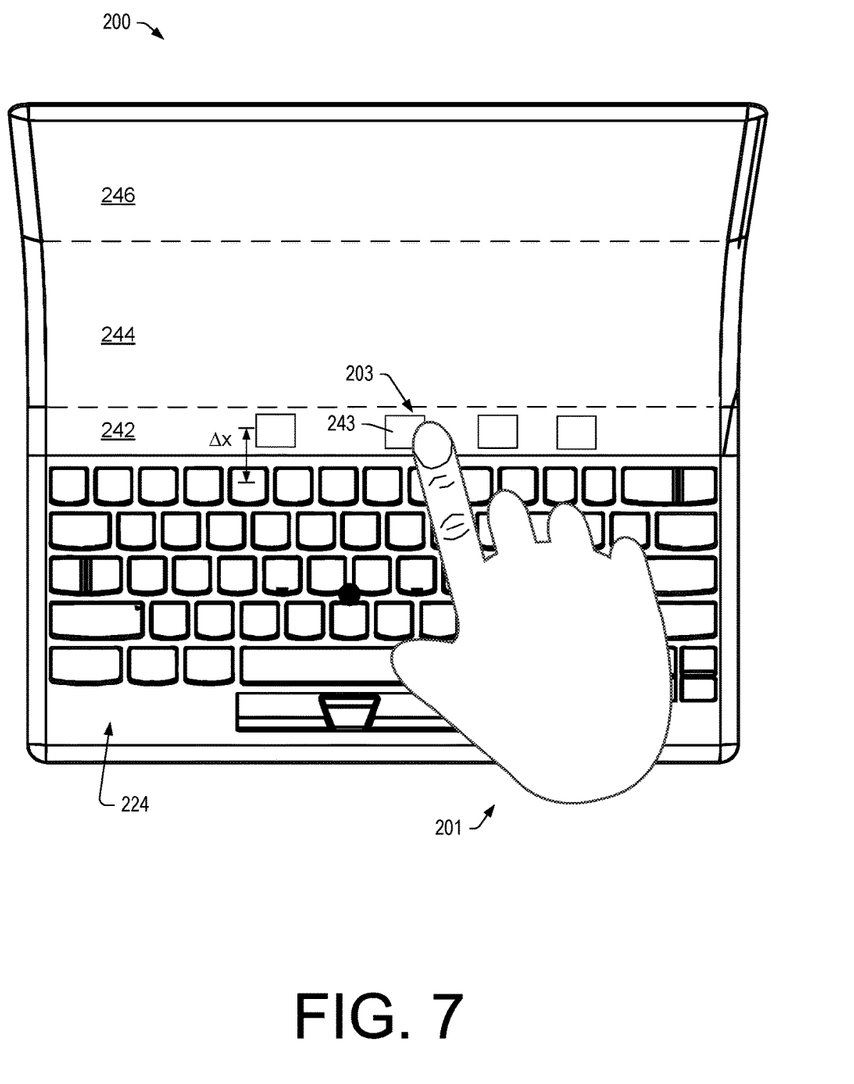
FIG. 7 is a plan view of the example device of FIG. 2 in an open orientation.

FIG. 7 shows a plan view of the device 200 in an open orientation where the display portions 242, 244 and 246 are visible. As shown, one or more graphic controls 243 may be rendered to the display portion 242 where such one or more graphic controls 243 may respond to receipt of touch input by the device 200 (e.g., via a touchscreen display). As shown in FIG. 7, a hand 201 includes a fingertip 203 where the device 200 can detect touch input from the fingertip 203 when a user touches one of the graphic controls 243. As shown, the hand 201 can be positioned in a manner where fingers can be readily positioned for typing using the keyboard 224 of the device 200. In the example of FIG. 7, a dimension Δx is shown as a distance from a key of the keyboard 224 to one of the one or more graphic controls 243. Such a dimension may be, for example, approximately a key-to-key distance or, for example, less than approximately 300 percent of a key-to-key (e.g., key center-to-key center) distance, or, for example, less than approximately 200 percent of a key-to-key (e.g., key center-to-key center) distance. Such a distance may be convenient for a user to move from the keyboard 224 to one or more of the one or more graphic controls 243.

Figure 8:
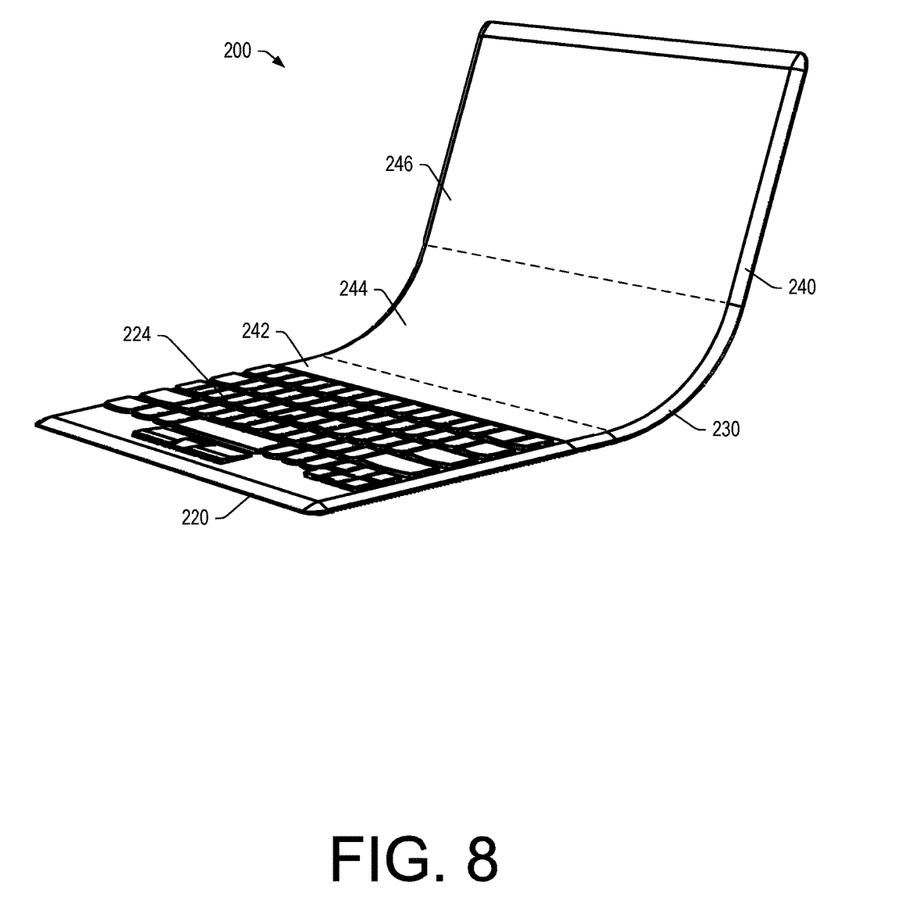
FIG. 8 is a perspective view of the example device of FIG. 2 in an open orientation.

FIG. 8 shows a perspective view of the device 200 in an open orientation where display portions 242, 244 and 246 are visible. As an example, the device 200 can render information to one or more of the display portions 242, 244 and 246. As an example, an application can be executed in an operating system environment established at least in part via a processor of the device 200. In such an example, the application can include one or more control bars (e.g., toolbars) that can be renderable in one or more of the display portions 242, 244 and 246. As an example, consider a photo editing program where a photo is rendered to the display portion 246 and where information is rendered to the portion 244 and one or more tools are rendered to the display portion 242. In such an example, a user may view information in the display portion 244 germane to editing of the photo rendered to the portion 246 while selecting one or more tools via the portion 242.

As an example, an application can include a curved display mode of operation where the device 200 can render one or more graphical user interfaces to one or more portions of the display 241, which may facilitate user interactions given the curvature of the display 241, the curved portion 244 of the display 241 and/or one or more substantially flat portions 242 and 246 of the display 241.

Figure 9:
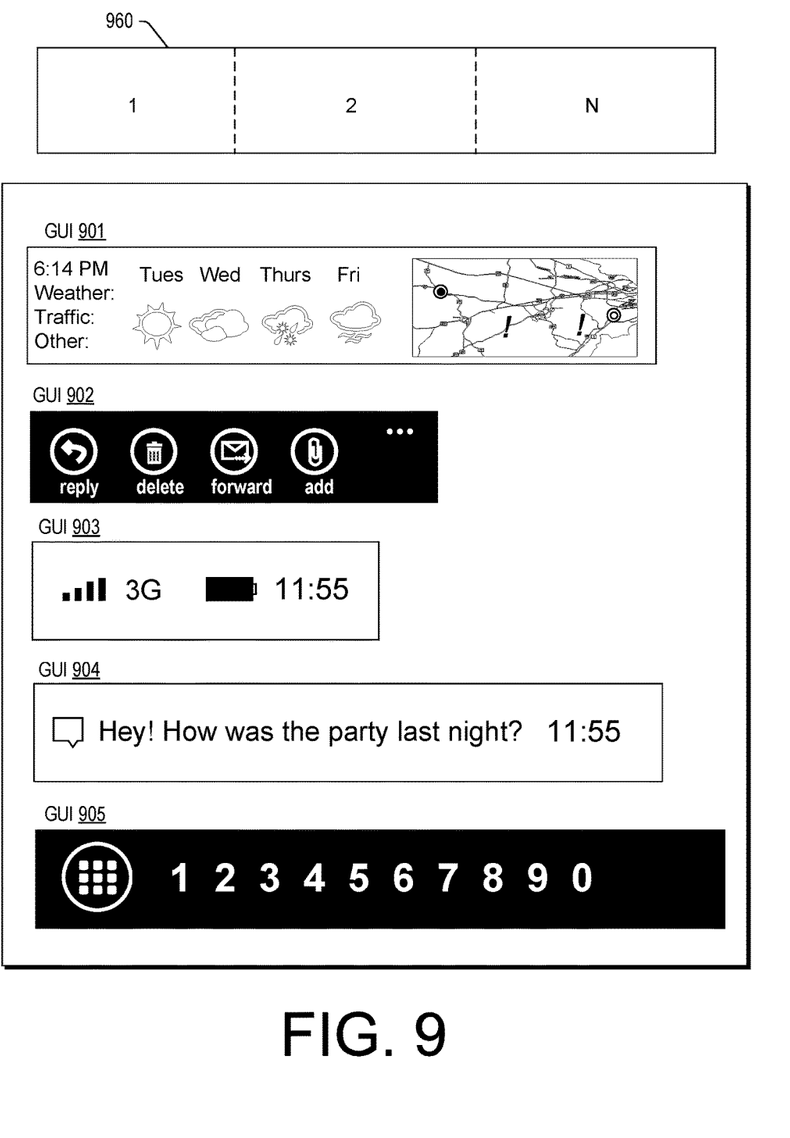
FIG. 9 is a series of views of examples of graphical interfaces that can be rendered to at least a portion of a display.

FIG. 9 shows an example of a portion of a display 960, which may be a portion of a flexible display or a display that includes a flexible portion. As shown, the portion of the display 960 includes panels 1, 2 to N, which may be user defined or otherwise defined (e.g., via an application, etc.). FIG. 9 also shows example GUIs 901, 902, 903, 904 and 805, which may optionally be assigned to one or more panels of the display portion 960. The GUI 901 shows information such as weather and/or traffic information, which may be from a service (e.g., an Internet service, a cellular service, etc.). The GUI 902 shows information associated with email. The GUI 903 shows information associated with a connection, power and time, which may be that of a device or a device that is in communication with the display portion 960. The GUI 904 shows messaging information. The GUI 905 shows a keypad graphic with keys that may be utilized, for example, for numeric entry to perform one or more operations (e.g., dial a phone number, operate a calculator, etc.).

As an example, the display portion 960 may correspond to the display portion 242, which can be readily accessible for touch input and/or may correspond to the display portion 244, which may be accessible as well for touch input. As an example, the display portion 244 may include information that helps to identify a touchable control of the display portion 242. In such an example, where functions are associated with an application, the application may be executable to render information to the display portion 244 that explains, identifies, etc., one or more touch controls that can be interacted with via the display portion 242.

As an example, a device can include a folding case that includes a fold region that defines a first portion and a second portion of the folding case; a housing disposed on the first portion of the folding case where the housing includes a processor, memory operatively coupled to the processor, and a keyboard operatively coupled to the processor; and a flexible display operatively coupled to the processor and disposed in part on the first portion of the folding case and disposed in part on the second portion of the folding case. In such an example, the device can be referred to as an asymmetric display device as the flexible display can be a contiguous display that spans a fold region. As an example, for an end to end length of the device, the flexible display can be a contiguous display that may be of a length that is greater than approximately 50 percent of the end to end length of the device (e.g., in the x-direction as shown in various examples such as those of FIG. 3 and FIG. 5).

As an example, a device can include a folded state and an unfolded state. In such an example, in the folded state, a first portion of a folding case can define a folded footprint of the device and, for example, in the unfolded state, the first portion of the folding case and a portion of a second portion of the folding case define an unfolded footprint of the device. As an example, an unfolded state footprint of a device can be larger than a folded footprint of the device. For example, the unfolded state footprint of the device can be at least approximately 5 percent greater than the folded state footprint of the device. As an example, an area of a footprint of a device in a folded state can be less than a display area of a flexible display of the device.

As an example, a first portion of a device may be a first half of a folding case of the device and a second portion of the device may be a second half of the folding case. In such an example, the device may be defined as being symmetric with respect to folding; however, as mentioned a device can be asymmetric with respect to a flexible display as such a flexible display can be in part in a first portion, which may be a first half, and in part in a second portion, which may be a second half. As an example, a device may be a symmetric folding device with respect to a case and an asymmetric device with respect to a display thereof. In such an example, the folding of the device folds the display (e.g., at least a portion of the display is flexible to form a curve).

As an example, a device can, in a folded state, form a gap that can separate moveable components (e.g., keyboard keys, a control tool, etc.) of one portion of the device and a surface of another portion of the device. In such an example, the gap may be triangular in cross-sectional shape, trapezoidal in cross-sectional shape, etc. As an example, a gap may help to reduce risk of marring of a surface of a display when the device is in a closed orientation. Further, the gap may comport with a shape of the device that is suitable for gripping by a hand (see, e.g., examples of FIG. 3).

As an example, a device can include a flexible display that is or that includes a touchscreen display. In such an example, in an unfolded state, a first portion of a folding case of the device and a portion of a second portion of the folding case can define an unfolded footprint of the device, larger than a folded footprint of the device, that increases physical stability of the device on a horizontal surface in the unfolded state.

As an example, a device can include a rigid housing. For example, a rigid housing may support a keyboard, which may include depressible keys that receive force via touch-typing. As an example, a rigid housing can include one or more electronic components, which may be and/or include circuitry. For example, consider a rigid housing that includes a battery, which may be a lithium-ion battery. As an example, a rigid housing can include one or more interfaces that, for example, may be or include one or more plug-in interfaces that can receive plugs to operatively couple one or more components to circuitry carried by the rigid housing. For example, consider a serial interface such as a USB type of interface, an audio interface, a video interface, a memory card interface, a power supply interface, etc.

As an example, a housing of a device can be constructed at least in part or, for example, wholly from a metallic material. As an example, a folding case of a device can be constructed at least in part or, for example, wholly from an elastomeric material. As an example, a device can include an elastomeric material as a surface that is an exterior surface that can provide for grippability (e.g., via increase coefficient of friction with respect to one or more fingers of a hand, which can include the thumb as a finger). In such an example, the device can include a rigid housing that includes components, which may be, for example, protected at least in part by the rigidity of the housing (e.g., consider a crush resistant housing as may be associated with a smartphone that is susceptible to being sat on by a user when in a back pocket of the user's pants).

As an example, a device can include a flexible display that is an OLED display (e.g., a FOLED display, etc.).

As an example, a device can include instructions stored in memory and executable by a processor to render a graphical user interface to a flexible display of the device where the graphical user interface includes a control bar portion rendered to a portion of the flexible display that is disposed on a first portion of a folding case of the device. In such an example, the first portion can include a keyboard where keys are spaced at a distance from one another to define a key-to-key spacing. In such an example, a spacing can be defined from an upper key (e.g., in an upper row of keys) and one or more graphical controls of the control bar portion. In such an example, the spacing can be defined by a distance that can be less than approximately 300 percent than the key-to-key spacing (see, e.g., the example of FIG. 7). Such an arrangement can allow for a user to extend a finger or fingers while touch-typing to touch and thereby cause the device to receive touch input associated with one or more of the one or more graphical controls of the control bar portion. In such an example, the device may respond to the touch input to perform one or more actions. As an example, a user may rest a palm of a hand on a palm rest portion of a device that is below a set of keys of a keyboard of the device (e.g., in the x-direction) and, while the palm is resting on the palm rest portion, the user may extend a finger from the set of keys of the keyboard to a position above the set of keys of the keyboard (e.g., in the x-direction) to touch a portion of a display that is part of an overall flexible display of the device. As an example, a portion of a display of a device can be a curved portion, which may be a touchscreen display portion. In such an example, a user may extend a finger of a hand forward, optionally while maintaining a palm of the hand resting on a palm rest portion of the device (see, e.g., the display portion 244 of the example of FIG. 7 where the finger may extend further forward in the x-direction to contact the display portion 244).

As an example, a device can include a folding region that defines a minimum radius of curvature, for example, in a closed orientation of the device. In such an example, the folding region may be limited to a maximum radius of curvature in an open orientation, for example, via one or more mechanisms that may be part of a folding region. As an example, a device may include a folding region that allows the device to be opened to a substantially planar open orientation where a flexible display transitions from open orientations where a portion of the flexible display is curved to a substantially planar orientation where the portion of the flexible display is substantially planar (e.g., to form a planar display of the device).

As an example, a device can include an unfolded state where at least a portion of a flexible display that is disposed in part on a first portion of a folding case of the device is co-planar with a plane of a keyboard of the first portion.

As an example, a device can include an unfolded state where a flexible display includes a bend that is greater than approximately 90 degrees and less than approximately 180 degrees. Such an unfolded state can correspond to an open orientation of the device (see, e.g., the example of FIG. 5).

As an example, a device may include an unfolded state where a flexible display of the device is substantially co-planar with a plane of a keyboard of the device.

As an example, a device can include a fold region of a folding case that includes support features. In such an example, in the unfolded state, at least a portion of the support features may be substantially co-planar with a plane of a first portion of the folding case (e.g., a keyboard portion of the device). As an example, a support feature can be a rib, a nib, etc., as a feature that may extend away from the fold region to support the device on a surface (e.g., footprint support) when the device is in an open orientation (see, e.g., the example of FIG. 5). As an example, a support feature of a fold region of a device may be comfortable to a palm of a hand when the device is held by the hand (see, e.g., the example of FIG. 3). For example, a support feature may be made of an elastomeric material that does not dig into the skin of a palm of a hand in a manner that would be uncomfortable to a user (e.g., which may cause a user discomfort, desire to release the device, etc.).

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that include at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 10:
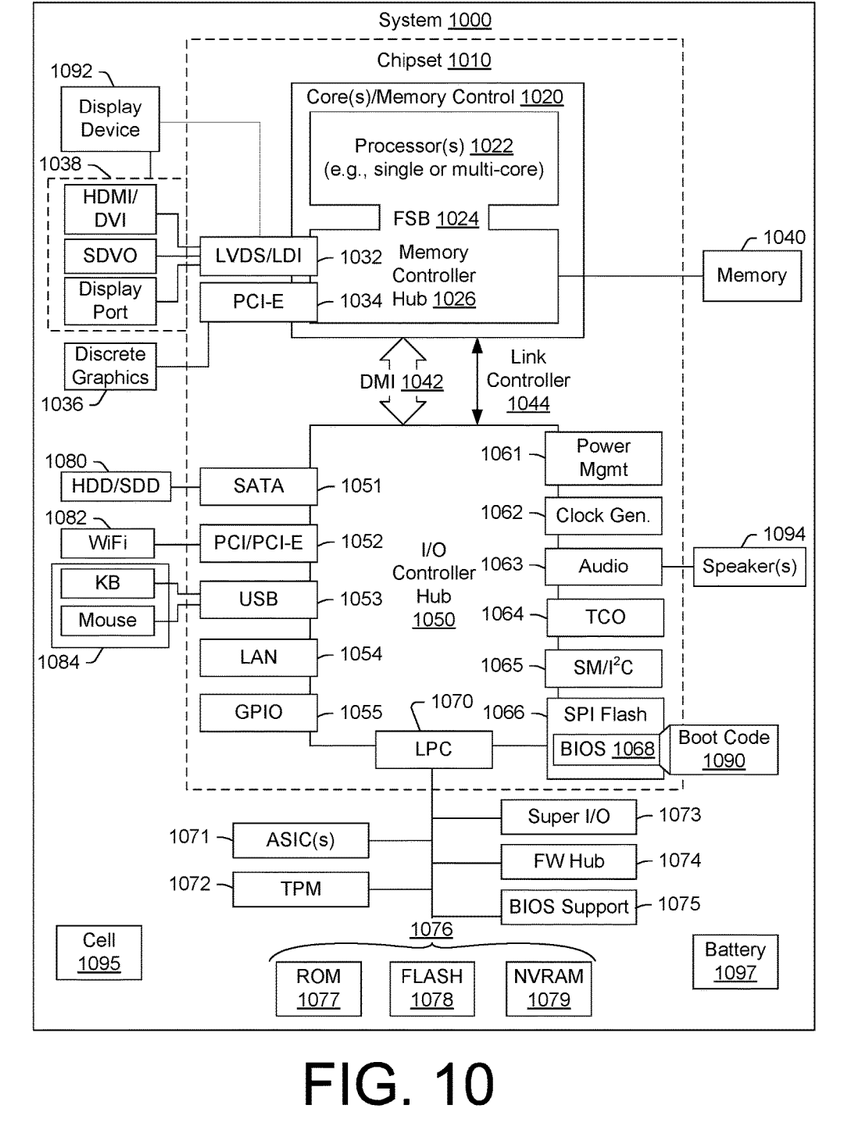
FIG. 10 is a diagram of an example of a system that includes one or more processors.

While various examples of circuits or circuitry have been discussed, FIG. 10 depicts a block diagram of an illustrative computer system 1000. The system 1000 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1000. As an example, the device 200 of FIG. 2, etc., can include one or more features of the system 1000 of FIG. 10.

As shown in FIG. 10, the system 1000 includes a so-called chipset 1010. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 10, the chipset 1010 has a particular architecture, which may vary to some extent depending on brand or manufacturer. The architecture of the chipset 1010 includes a core and memory control group 1020 and an I/O controller hub 1050 that exchange information (e.g., data, signals, commands, etc.) via, for example, a direct management interface or direct media interface (DMI) 1042 or a link controller 1044. In the example of FIG. 10, the DMI 1042 is a chip-to-chip interface (sometimes referred to as being a link between a "northbridge" and a "southbridge").

The core and memory control group 1020 include one or more processors 1022 (e.g., single core or multi-core) and a memory controller hub 1026 that exchange information via a front side bus (FSB) 1024. As described herein, various components of the core and memory control group 1020 may be integrated onto a single processor die, for example, to make a chip that supplants the conventional "northbridge" style architecture.

The memory controller hub 1026 interfaces with memory 1040. For example, the memory controller hub 1026 may provide support for DDR SDRAM memory (e.g., DDR, DDR2, DDR3, etc.). In general, the memory 1040 is a type of random-access memory (RAM). It is often referred to as "system memory".

The memory controller hub 1026 further includes a low-voltage differential signaling interface (LVDS) 1032. The LVDS 1032 may be a so-called LVDS Display Interface (LDI) for support of a display device 1092 (e.g., a CRT, a flat panel, a projector, etc.). A block 1038 includes some examples of technologies that may be supported via the LVDS interface 1032 (e.g., serial digital video, HDMI/DVI, display port). The memory controller hub 1026 also includes one or more PCI-express interfaces (PCI-E) 1034, for example, for support of discrete graphics 1036. Discrete graphics using a PCI-E interface has become an alternative approach to an accelerated graphics port (AGP). For example, the memory controller hub 1026 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1050 includes a variety of interfaces. The example of FIG. 10 includes a SATA interface 1051, one or more PCI-E interfaces 1052 (optionally one or more legacy PCI interfaces), one or more USB interfaces 1053, a LAN interface 1054 (more generally a network interface), a general purpose I/O interface (GPIO) 1055, a low-pin count (LPC) interface 1070, a power management interface 1061, a clock generator interface 1062, an audio interface 1063 (e.g., for speakers 1094), a total cost of operation (TCO) interface 1064, a system management bus interface (e.g., a multi-master serial computer bus interface) 1065, and a serial peripheral flash memory/controller interface (SPI Flash) 1066, which, in the example of FIG. 10, includes BIOS 1068 and boot code 1090. With respect to network connections, the I/O hub controller 1050 may include integrated gigabit Ethernet controller lines multiplexed with a PCI-E interface port. Other network features may operate independent of a PCI-E interface.

The interfaces of the I/O hub controller 1050 provide for communication with various devices, networks, etc. For example, the SATA interface 1051 provides for reading, writing or reading and writing information on one or more drives 1080 such as HDDs, SDDs or a combination thereof. The I/O hub controller 1050 may also include an advanced host controller interface (AHCI) to support one or more drives 1080. The PCI-E interface 1052 allows for wireless connections 1082 to devices, networks, etc. The USB interface 1053 provides for input devices 1084 such as keyboards (KB), one or more optical sensors, mice and various other devices (e.g., microphones, cameras, phones, storage, media players, etc.). On or more other types of sensors may optionally rely on the USB interface 1053 or another interface (e.g., I²C, etc.). As to microphones, the system 1000 of FIG. 10 may include hardware (e.g., audio card) appropriately configured for receipt of sound (e.g., user voice, ambient sound, etc.).

In the example of FIG. 10, the LPC interface 1070 provides for use of one or more ASICs 1071, a trusted platform module (TPM) 1072, a super I/O 1073, a firmware hub 1074, BIOS support 1075 as well as various types of memory 1076 such as ROM 1077, Flash 1078, and non-volatile RAM (NVRAM) 1079. With respect to the TPM 1072, this module may be in the form of a chip that can be used to authenticate software and hardware devices. For example, a TPM may be capable of performing platform authentication and may be used to verify that a system seeking access is the expected system.

The system 1000, upon power on, may be configured to execute boot code 1090 for the BIOS 1068, as stored within the SPI Flash 1066, and thereafter processes data under the control of one or more operating systems and application software (e.g., stored in system memory 1040). An operating system may be stored in any of a variety of locations and accessed, for example, according to instructions of the BIOS 1068. Again, as described herein, a satellite, a base, a server or other machine may include fewer or more features than shown in the system 1000 of FIG. 10. Further, the system 1000 of FIG. 10 is shown as optionally include cell phone circuitry 1095, which may include GSM, CDMA, etc., types of circuitry configured for coordinated operation with one or more of the other features of the system 1000. Also shown in FIG. 10 is battery circuitry 1097, which may provide one or more battery, power, etc., associated features (e.g., optionally to instruct one or more other components of the system 1000). As an example, a SMBus may be operable via a LPC (see, e.g., the LPC interface 1070), via an I²C interface (see, e.g., the SM/I²C interface 1065), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A device comprising:
   a folding case that comprises a fold region that defines a first portion and a second portion of the folding case, wherein the first portion comprises a first end and wherein the second portion comprises a second end;
   a housing disposed on the first portion of the folding case wherein the housing comprises a processor, memory operatively coupled to the processor, and a keyboard operatively coupled to the processor; and a flexible display operatively coupled to the processor and disposed in part on the first portion of the folding case and disposed in part on the second portion of the folding case, wherein, in a folded state of the device, the fold region forms a hand grip that comprises an outer radius greater than or equal to approximately 15 mm, and wherein, in the folded state, a substantially triangular gap exists defined by a dimension near the fold region that is greater than a dimension near the first and second ends wherein the substantially triangular gap prevents contact between at least some depressible keys of the keyboard and the flexible display as disposed on the second portion of the folding case.

2. The device of claim 1 comprising an unfolded state.

3. The device of claim 1 wherein, in the folded state, the first portion of the folding case defines a folded footprint of the device.

4. The device of claim 2 wherein, in the unfolded state, the first portion of the folding case and a portion of the second portion of the folding case define an unfolded footprint of the device.

5. The device of claim 2 wherein an unfolded state footprint of the device is larger than a folded footprint of the device.

6. The device of claim 5 wherein the unfolded state footprint of the device is at least approximately 5 percent greater than the folded state footprint of the device.

7. The device of claim 1 wherein an area of a footprint of the device in the folded state is less than a display area of the flexible display.

8. The device of claim 1 wherein the first portion comprises a first half of the folding case and wherein the second portion comprises a second half of the folding case.

9. The device of claim 1 wherein the flexible display comprises a touchscreen display, wherein, in an unfolded state, the first portion of the folding case and a portion of the second portion of the folding case define an unfolded footprint of the device, larger than a folded footprint of the device, that increases physical stability of the device on a horizontal surface in the unfolded state.

10. The device of claim 1 wherein the housing comprises a rigid housing.

11. The device of claim 1 wherein the housing comprises a metallic material and wherein the folding case comprises an elastomeric material.

12. The device of claim 1 wherein the flexible display comprises an OLED display.

13. The device of claim 1 comprising instructions stored in the memory and executable by the processor to render a graphical user interface to the flexible display wherein the graphical user interface comprises a control bar portion rendered to a portion of the flexible display that is disposed on the first portion of the folding case.

14. The device of claim 1 wherein the folding region defines a minimum radius of curvature.

15. The device of claim 1 comprising an unfolded state wherein at least a portion of the flexible display that is disposed in part on the first portion of the folding case is co-planar with a plane of the keyboard.

16. The device of claim 1 comprising an unfolded state wherein the flexible display comprises a bend that is greater than approximately 90 degrees and less than approximately 180 degrees.

17. The device of claim 1 comprising an unfolded state wherein the flexible display is substantially co-planar with a plane of the keyboard.

18. The device of claim 1 wherein the fold region of the folding case comprises support features.

19. The device of claim 18 wherein, in the unfolded state, at least a portion of the support features are substantially co-planar with a plane of the first portion of the folding case.

20. A device comprising:
a folding case that comprises a fold region that defines a first portion and a second portion of the folding case;
a housing disposed on the first portion of the folding case wherein the housing comprises a processor, memory operatively coupled to the processor, and a keyboard operatively coupled to the processor; and
a flexible display operatively coupled to the processor and disposed in part on the first portion of the folding case and disposed in part on the second portion of the folding case,
wherein the flexible display comprises a touchscreen display, and
wherein, in an unfolded state, the first portion of the folding case and a portion of the second portion of the folding case define an unfolded footprint of the device, larger than a folded footprint of the device, that increases physical stability of the device on a horizontal surface in the unfolded state.

* * * * *